D. WELLINGTON.
Improvement in Water-Closets.
No. 114,238. Patented April 25, 1871.
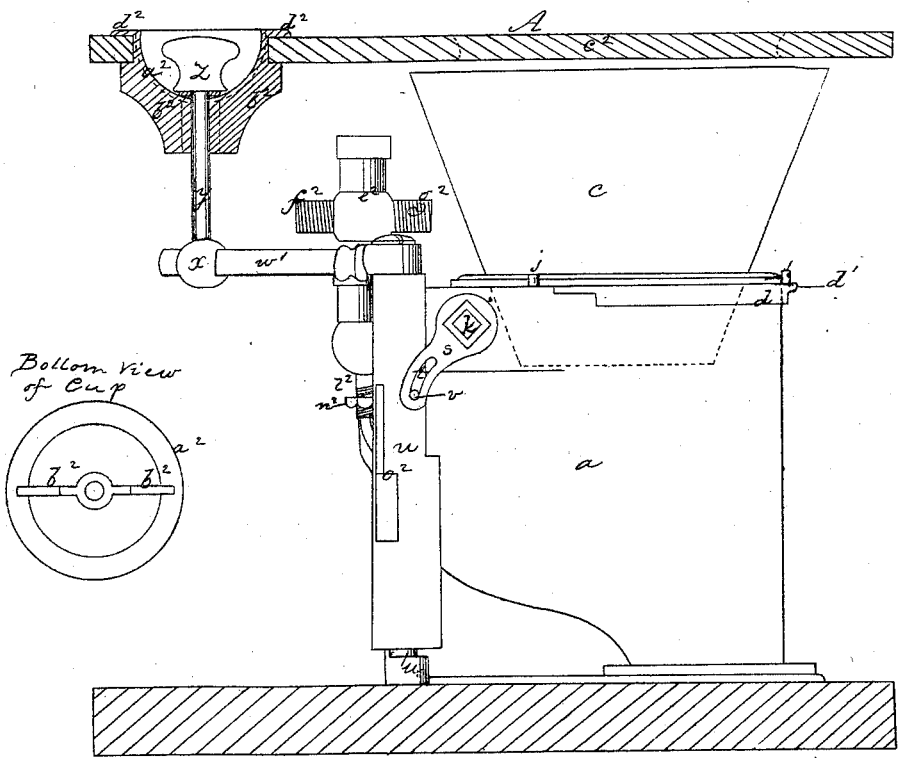
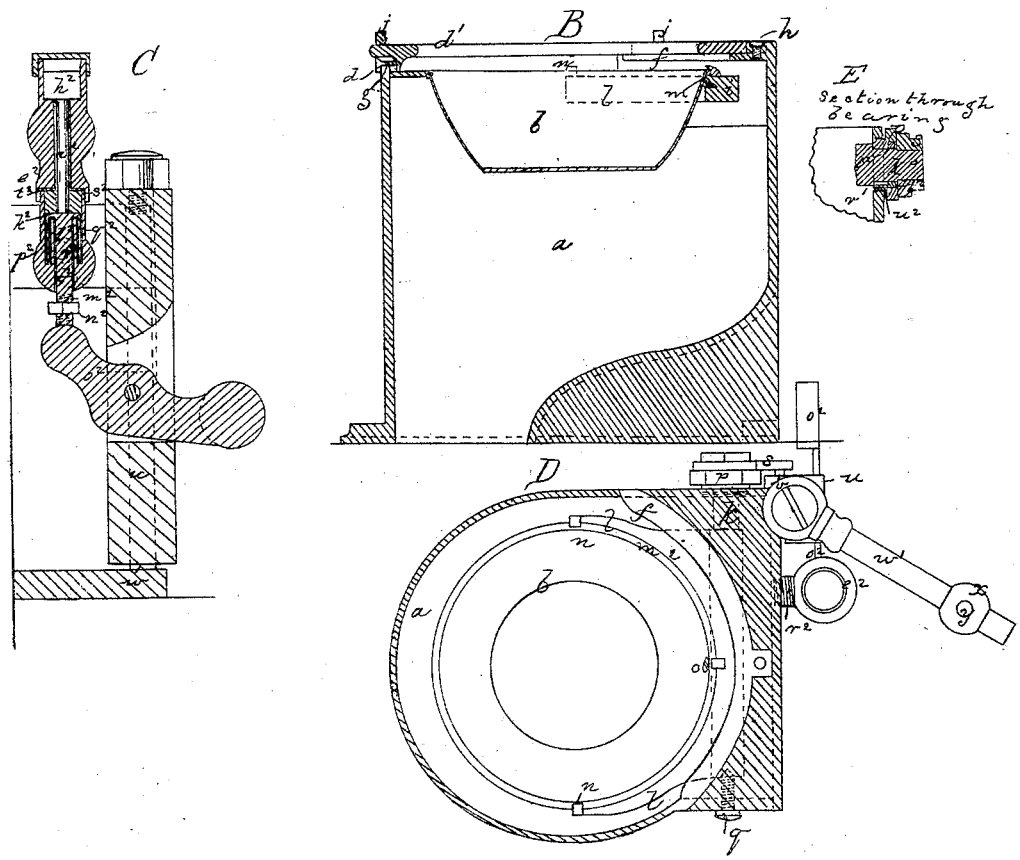

UNITED STATES PATENT OFFICE.

DARIUS WELLINGTON, OF BOSTON, MASSACHUSETTS.

IMPROVEMENT IN WATER-CLOSETS.

Specification forming part of Letters Patent No. 114,238, dated April 25, 1871.

*To all whom it may concern:*

Be it known that I, DARIUS WELLINGTON, of Boston, in the county of Suffolk and State of Massachusetts, have invented Improvements in Water-Closets; and I do hereby declare that the following, taken in connection with the drawing which accompanies and forms part of this specification, is a description of my invention sufficient to enable those skilled in the art to practice it.

The invention relates to details of construction of pan-closets, with particular reference to the construction of the container-top for admission and removal of the pan; to the manner of fastening the pan to its hinged support or carrier; to the construction of the cup with reference to its application to the seat-board; to the arrangement of the weight that holds the pan in position; and to the construction and arrangement of the valve which controls the flow of water into the closet.

The drawing represents a closet embodying my improvements.

A denotes a side view of the closet. B is a central vertical section of it. C is a vertical section of the valve and adjacent mechanism. D is a plan of the pan and the hinged carrier to which it is fastened.

$a$ denotes the container, in which swings the pan $b$, and upon which rests the bowl $c$.

The container is cast in one piece, except as to the rim $d^1$, or top thereof. This rim is cast as a separate piece, with two flanges, $d\,e$, depending from it, these flanges forming a groove, which receives the upper edge of the container.

At the side of the container where the pan $b$ is hinged is a flange, $f$, on which the corresponding side of the rim rests.

The rim is fastened to the container by screws $g\,h$, which prevent upward movement of it, the flanges $d\,e$ keeping it from lateral movement; and it will readily be seen that by reaching into the inner flange, $e$, a tight putty-joint may be easily made all around the flange $e$, between it and the inner surface of the container, the putty being stuffed into the intervening space.

By taking out the screws $g\,h$ and starting the rim by a few upward blows at its outer edge the rim may be removed at any time for access to the pan for repairs, or for its removal or replacement.

On top of the rim $d$ are guide-pins $j$, for centering the bowl.

The pan is attached to a carrier, $i$, upon one end of which is a gudgeon, $k$, supported in a bearing in the container, while the other end is provided with a socket, by which it is supported and turns on a screw-pin, $q$, the pan being dropped down toward a vertical position and brought back into a horizontal position by rocking movement of the carrier.

The pan is applied to the carrier $i$ as follows: The two arms $l\,l$ of the carrier extend partially around the pan, as shown at D, and under the rim thereof, the rim $m$ of the pan resting upon the edge of the arms along their whole length. At the outer end of each arm is a hook or finger, $n$, which extends up over the rim of the pan, as seen at D. At the center of the carrier a screw, $o$, passes through the pan and enters the carrier.

In applying the pan, its rim is slid in under the two fingers $n$ until the side of the pan touches the carrier at the screw-hole. The screw is then passed through the pan into the carrier. The fingers $n$, arms $l\,l$, and screw $o$ will clasp and fasten the rim tightly, the connection being much stronger, more perfect, and less liable to be broken under the movements of the pan than where such connection is made by soldering or brazing, while the pan may be easily and quickly removed at any time when necessary for repairs or other purposes.

The gudgeon $k$, at one end of the carrier $i$, is journaled in a hollow screw or screw-bearing, $p$, the screw-thread of which turns in a nut-thread formed in the container-wall. This screw-bearing abuts against a shoulder, $r$, at the inner end of the gudgeon, and as the screw is turned up it forces the carrier lengthwise against the screw-pivot pin $q$ at its opposite end. By turning back or removing the screw $p$ the carrier is loosened and may be drawn back sufficiently to bring its opposite end clear from the pivot-pin, and the carrier can then be removed from the closet. By means of the two screws $p\,q$ the carrier may be moved laterally in either direction to adjust the pan in position.

To the outer end of the gudgeon is fixed a short lever, $s$, having a slot, $t$, into which projects, from a reciprocating weight or weighted slide, $u$, a pin, $v$, the slide reciprocating vertically on a stationary rod, $w$. When the sliding weight is raised the pin $v$ throws up the lever, thereby tipping down the pan, and when the weight falls the pan is thereby brought back to horizontal position, and in this latter position of the parts the lower end of the lever-slot occupied by the pin $v$ is nearly vertical, so that the pan cannot become loose and cannot fall or drop down without the weight is raised.

To the top of the weighted slide a horizontal arm, $w'$, is fastened, and on this arm slides a thimble, $x$, to which is fastened the rod $y$, at whose top is the pull $z$, by which the pan is raised, this pull resting in the cup $a^2$.

The arm $w'$ is fastened to the top of the slide by a screw, and by starting the screw the arm may be set in any position in the direction where it is desirable to locate the cup and pull, and the rod $y$ may be slid upon the arm to bring the rod into vertical position in line with the cup or the position to be occupied by the cup. This cup $a^2$ has on each side of it a wing or projection, $b^2$, the wings forming a button for fastening the cup to the seat-board $c^2$, the top of each wing or projection being at a distance from the flange $d^2$ of the cup equal to or slightly less than the thickness of the board, and the wings dropping through slots cut through the board.

The lower surface of the board, concentric to the tops of the projections, is cut away slightly, so that by turning the cup it may be secured tightly to the board.

The cup is preferably made of cast-iron, and to preserve its surface from corrosion I coat it with nickel by electro-deposition, thereby giving to it a bright and enduring surface which will not easily tarnish.

$e^2$ denotes the valve-case, into which the induction-pipe $f^2$ and from which the eduction-pipe $g^2$ lead. $h^2$ denotes the valve, the stem $i^2$ of which passes down through the valve-chamber and rests upon a cap, $k^2$, from which depends a spindle, $l^2$, having on its lower end a screw-thread, $m^2$, upon which plays a nut, $n^2$.

The spindle $l^2$ rests upon one end of a weighted lever, $o^2$, pivoted in the weighted slide $u$.

When the slide $u$ is raised to drop the pan the lever $o^2$ rises with it, and, lifting the spindle $l^2$, pushes up the valve $h^2$, letting water through the valve-case, from the induction-pipe into the eduction-pipe, and thence into the bowl to rinse the bowl and pan. When the spindle-nut $n^2$ strikes the bottom of the valve-case the lever $o^2$ will tip and allow the slide $u$ to continue its ascent, and when the slide is dropped the lever keeps its contact with the spindle and holds the valve open until the pan has come up into or nearly into horizontal position, the valve thereby opening the instant the pan begins to drop, and not being closed until the pan gets back to horizontal position.

Now, as the valve-stem $i^2$ and the spindle $l^2$ have to work loosely through the valve-case, and as the water will therefore leak down by them, I provide for the prevention of the escape of such water through the bottom of the case as follows: In the lower part of the case is a chamber or cup, $p^2$, concentric with the spindle $l^2$, into which cup a flange or ring, $q^2$, projects down from the spindle-cap, as seen at C, the flange and cup forming a fluid-trap. From the bottom of the cup a pipe, $r^2$, passes, said pipe leading into the container $a$. Now, as the water leaks past the valve-stem $i^2$ and drops upon the cap $k^2$, it passes down the outside of such cap into the cup $p^2$, from whence it will flow, through the pipe $r^2$, into the container, as will be readily understood.

The upper part of the valve-case is united to the lower part by a screw-joint, $s^2$, the joint being packed by a washer, $r^2$.

To adjust the flow of water through the valve the nut $n^2$ is used, the extent of rise of the valve and flow of water consequent thereupon being regulated by the position of the nut, movement of the valve being arrested when the nut strikes the bottom of the valve-case.

To prevent leakage of water over the gudgeon or journal $k$, the hollow screw or bearing $p$, in which the journal is supported, is made with a groove, $t^2$, as seen at E, from which groove an aperture, $u^2$, leads into the container, water which swashes upon the journal dripping into this groove and escaping back into the container through this aperture.

I claim—

1. In combination with the container $a$, the rim $d^1$, having the flanges $d\ e$, which embrace the edge of the container, the rim being fastened to the container, substantially as described.

2. The combination of the pan with the carrier, to which it is attached by means of the arms $l\ l$, fingers $n$, and screw-pin $o$, substantially as described.

3. The weighted slide $u$, arranged to operate the pan and valve, substantially as described.

4. In combination with the vertically-reciprocating slide, the horizontal arm $w'$, adjustable in position upon the slide, substantially as and for the purpose described.

5. The cup $a^2$, arranged to receive the knob $z$ and spindle $y$, when provided with the wings or buttons $b^2$, for fastening it to the seat of a water-closet.

6. The valve $h^2$, when operated by the weighted lever $o^2$ acting upon the spindle $l^2$, substantially as described.

7. In combination with the valve $h^2$ and valve-case $e^2$, the trap $p^2\ q^2$ and waste-pipe $r^2$, substantially as described.

8. The screw-bearing $k$, constructed with the groove $t^2$ and aperture $u^2$, substantially as described.

DARIUS WELLINGTON.

Witnesses:
FRANCIS GOULD,
S. B. KIDDER.